May 24, 1927.

D. H. MARTIN 1,629,518

POWER TRANSMITTING MECHANISM

Filed July 21, 1924     2 Sheets-Sheet 1

Inventor
D. H. Martin
By Harry H. Totten
Attorney.

May 24, 1927.
D. H. MARTIN
1,629,518
POWER TRANSMITTING MECHANISM
Filed July 21, 1924    2 Sheets-Sheet 2
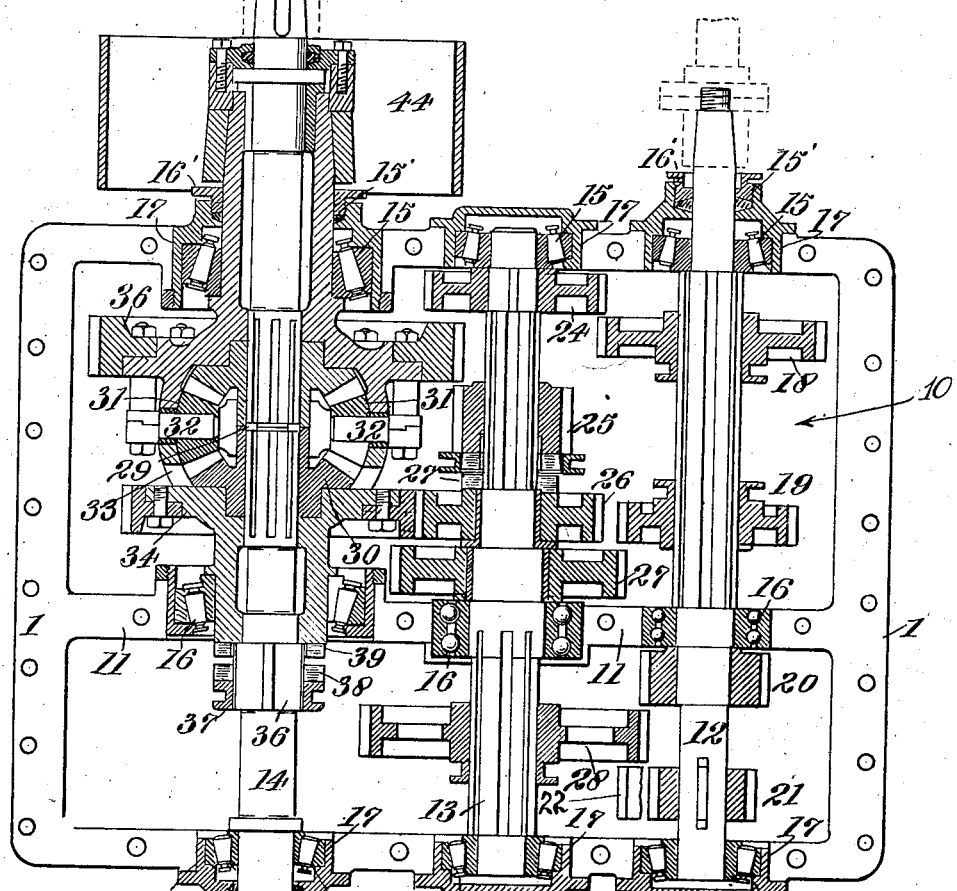
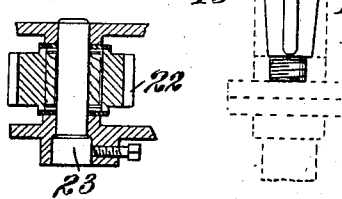
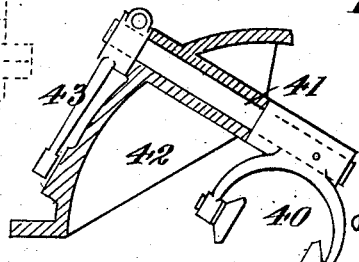

Patented May 24, 1927.

1,629,518

UNITED STATES PATENT OFFICE.

DANIEL H. MARTIN, OF LOS ANGELES, CALIFORNIA.

POWER-TRANSMITTING MECHANISM.

Application filed July 21, 1924. Serial No. 727,205.

This invention relates to a selective sliding gear power transmitting mechanism, designed particularly for use in what are commonly termed four-wheel drive vehicles.

Among its principal objects are to provide a power transmitting mechanism, wherein the customary chain drive is eliminated and wherein there is contained in a single gear case a plurality of shafts, mounting gears, certain of which are capable of selective movement to operate one of said shafts at a number of different speeds in different directions.

A further object is to provide a power transmitting mechanism wherein the driven shaft is of the split type, connected by a differential gearing and wherein the split sections of the shaft are adapted for locking to rotate in unison under certain conditions, particularly when it is necesary to provide a direct drive to the forward and rear vehicle wheels.

Further objects are to provide a construction wherein speed selections are possible by either shifting gears on the drive shaft or counter shaft; and to provide a simple, readily accessible unit, wherein all parts, mainly three shafts, driving, counter and driven, are mounted within a single gear case; and to associate with the driven shaft a brake hub, with which is adapted to coact brake mechanism or shoes also carried by the gear case.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To readily understand the invention, one embodiment of the same is illustrated in the accompanying drawings and in such illustration—

Fig. 3 is a view in plan of the transmission mechanism, with the upper half of the gear case removed.

Fig. 4 is a view in broken detail of the means for shifting the clutch for connecting the differential housing with the driven shaft.

Fig. 5 is a view in sectional detail of the reverse gear pinion.

Figure 1:
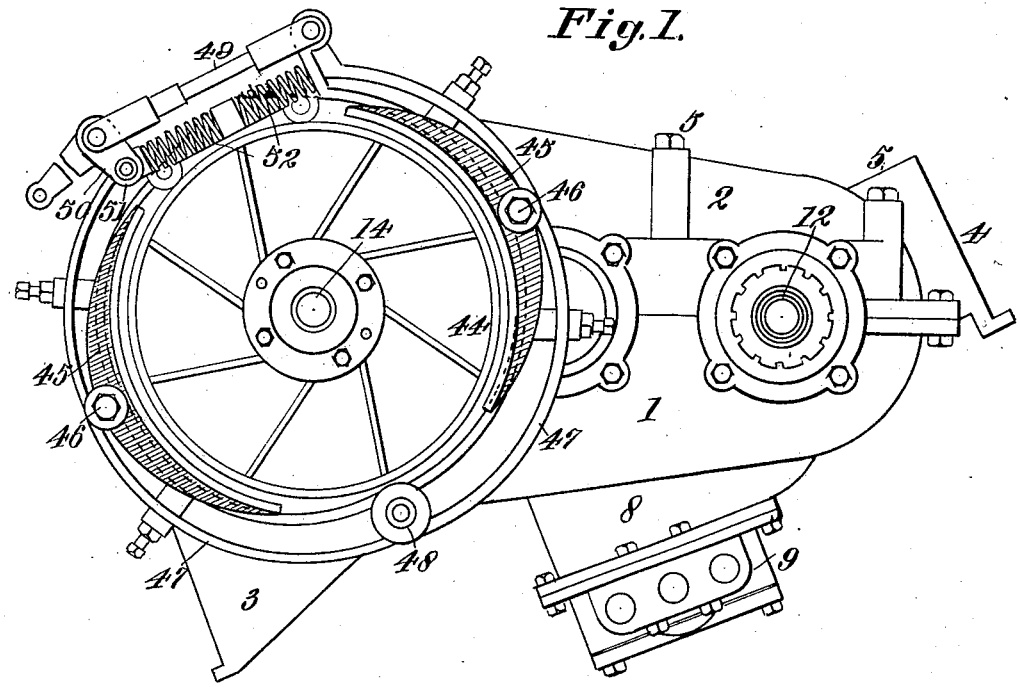
Fig. 1 is a view in side elevation of the gear case in upside down position, illustrating particularly the brake drum, bands and brake shoes.
Figure 2:
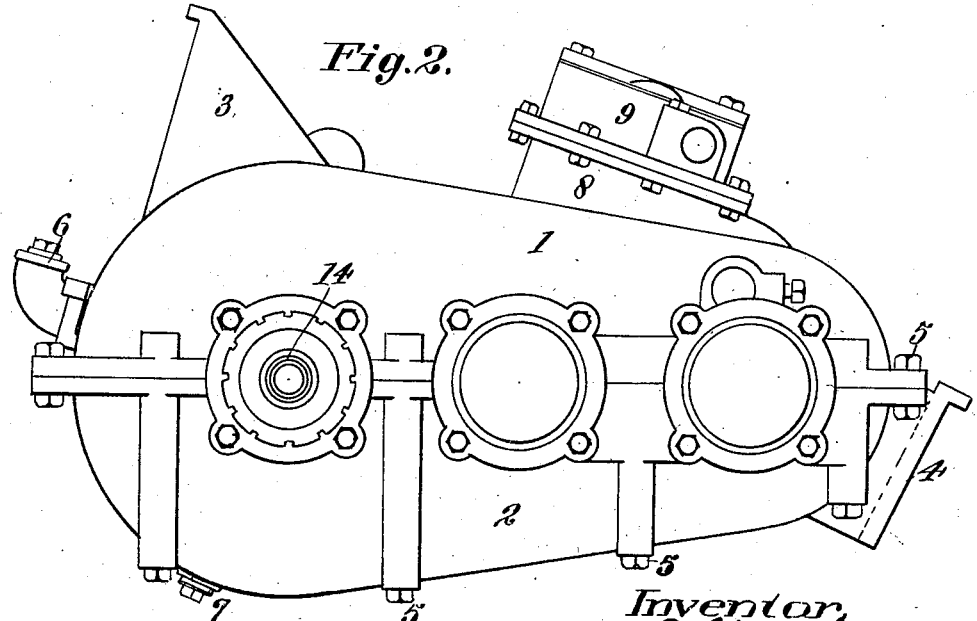
Fig. 2 is a view in side elevation of the embodiment illustrated in Fig. 1, the gear case being in upright position.

To more fully comprehend the invention, reference is directed to the several figures of the drawing, wherein like characters of reference indicate coresponding parts throughout the several views and wherein the numerals 1 and 2 indicate respectively the cover and main body portion of the gear case, the respective portions of the case being provided with hanger brackets 3 and 4, Figs. 1 and 2 of the drawings. The case is conventionally split in half on a horizontal line and the two portions 1 and 2 are held together by conventional bolts 5. A lubricant filling opening 6 is provided in the cover 1 and a drain opening 7 is formed in the main body portion 2. As in all gear case constructions, a boss 8 rises from the cover 1 and the portion 9 thereof carries the usual shift rod mechanism, of any well known type, from the rods of which depend the forks for engaging the shiftable gears disposed interiorly of the gear case. As this shift mechanism such as the rods and yokes, form no portion of the present invention, the detailed illustration thereof has been eliminated from the drawings.

Referring to Fig. 3, it will be observed that the interior of the main portion of the gear case is hollow as at 10 and that a bridge wall 11 extends across the interior thereof from end wall to end wall. Disposed transversely within the gear case, arranged in parallel spaced alignment, in the same horizontal plane, are the drive, counter, and driven shafts 12, 13 and 14, supported at their ends in suitable bearings 15 and also supported within their length by bearings 16 carried by the bridge wall 11. One end of the drive shaft and both ends of the driven shaft project beyond the side walls of the gear case, their projecting portions being engaged by packings 15', maintained under compression by the glands 16', the glands and packings together with the bearings for the shafts 12 and 14 and also the end bearings for the counter shaft 13, being carried in suitable bushings 17 received in suitable openings in the side walls of the gear case.

The drive shaft mounts for longitudinal movement thereon the high speed gear 18, the intermediate speed gear 19, the low speed drive gear 20, and the reverse drive gear 21, the two latter gears being held from longitudinal movement, while the two former gears are capable of shifting into engagement with corresponding gears hereinafter described, carried by the counter shaft. The reverse gear 21 intermeshes with a conventional reverse pinion 22 rotatable on a stud 23, extended inwardly from one end wall of the gear case as shown in Figs. 4 and 5. The counter shaft carries the high speed counter shaft gear 24 with which is adapted to engage the gear 18, and also carries the sliding gear 25, the gear 26 rotatable on the shaft 13 and adapted to have interlocking engagement with the gear 25 through the engagement of the jaw teeth 27 carried on adjacent faces of the respective gears 25 and 26. Adjacent the bridge wall 11, the shaft 13 carries a gear 27 adapted for intermeshing with the intermediate speed gear 19 of the drive shaft 12. On the other side of the bridge wall 11 the counter shaft carries the sliding gear 28 engageable either with the reverse pinion 22 or the low speed gear 20.

Referring particularly to the driven shaft 14, it will be observed that the same is split at 29, or is formed in two aligned sections, disposed in end to end relation and each mounts a beveled gear 30, the gears being interconnected through differential pinions 31 rotatable on the studs 32 carried by a rotatable differential gear case 33, the differential gear case being normally free to rotate as a unit relatively to the split sections of the driven shaft 14. One portion of the gear case carries a suitable gear 34 intermeshing with the free gear 26 on shaft 13, the other half of the differential gear housing carrying gear 35 into which is adapted to be moved into intermeshing relation the gear 25 on shaft 13, whereby through the respective gears 25 and 26 different speeds are adapted to be imparted to the shaft 14 through the differential gearing. Under certain conditions it has been found desirable to prevent differential movement between the split sections of the shaft 14 and to cause the shaft to operate at the same speed as a unit and to accomplish this result, on the squared portion 36 of the shaft I mount a dog clutch 37, the teeth 38 of which are adapted to engage corresponding teeth 39 formed on one end of the differential gear casing 33. The clutch 37 is adapted for operation independently of the movement of any of the selective gears and the shifting of the clutch is preferably accomplished through the oscillation of a yoke 40 carried by shaft 41 rotatably mounted in the bearing opening 42 in one wall of the gear case, the shaft 41 carrying exteriorly of the gear case a lever 43.

To one end of the differential gear housing is secured a brake drum 44 and for engagement with the periphery of which at diametrically opposite points across the shaft 14 are mounted for engagement the brake shoes 45, pivotally mounted within their length as at 46, on brake bands or arms 47 fulcrumed at corresponding ends as at 48 to the gear case. The free ends of the arms 47 are connected to a link 49, one end of which is secured to the mid portion of a bell crank lever 50, the end of which is pivoted as at 51 to one end of one of the members 47. Springs 52 resist the inward movement of the free ends of the arms 47 and at all times tend to release the shoes 45 from engagement with the periphery of the brake drum 44.

It will be observed that certain gear selections are possible by the movement of the gears 18 and 19 on shaft 12, and that other combinations are possible through the movement or shifting of the gears 25 and 28 on shaft 13, and it is also to be understood that with either of these gear combinations the yoke 40 may be operated to cause an interlocking of the split sections of the shaft 14 to dispense with the action of the differential action between them.

I claim:

A variable speed gearing including a gear case, drive, counter, and split driven shafts all rotatably mounted therein, gears carried by said drive and counter shafts for selective engagement, said counter shaft gears including a pair of gears one keyed to slide thereon and one free to rotate on the shaft to interlock with said sliding gear, a differential gearing connecting the ends of the split driven shaft and including a housing rotatable on said shafts, a pair of gears carried by the differential gear housing, and with one of which said freely rotatable counter shaft gear is in engagement and with the other of which said sliding gear selectively engages.

In testimony whereof I have signed my name to this specification.

DANIEL H. MARTIN.